United States Patent [19]

Karashima et al.

[11] Patent Number: 4,862,044
[45] Date of Patent: Aug. 29, 1989

[54] METHOD FOR ADJUSTING ENCODER IN A BRUSHLESS MOTOR-ENCODER COMBINATION

[75] Inventors: Kunihiko Karashima; Shoji Kumada; Katsumasa Yoshida; Hiroharu Katase, all of Iruma, Japan

[73] Assignee: Kabushiki Kaisha Yaskawa Denki Seisakusho, Kitakyushu, Japan

[21] Appl. No.: 170,323

[22] Filed: Mar. 18, 1988

[30] Foreign Application Priority Data

Mar. 25, 1987 [JP] Japan .................................. 62-71179

[51] Int. Cl.$^4$ ...................... H02K 29/06; G01D 5/00
[52] U.S. Cl. .................................. 318/254; 318/138; 318/439
[58] Field of Search ........................ 318/138, 254, 439

[56] References Cited

U.S. PATENT DOCUMENTS 3,917,988  11/1975  Payne .................................. 318/138
4,642,496   2/1987  Kerviel et al. .................. 318/254 X
4,740,733   4/1988  Epars .................................. 318/254
4,761,590   8/1988  Kaszman ........................ 318/138 X Primary Examiner—Bentsu Ro
Attorney, Agent, or Firm—Beveridge, DeGrandi & Weilacher

[57] ABSTRACT

A method for adjusting an encoder directly coupled with a brushless motor, wherein a set of sensor match marks are provided on a sensor base plate mounting a number of sensor elements, while another set of disc match marks are provided on an encoder disc at positions where, during the time when the motor is energized but locked, a phase difference between an EMF voltage waveform of the motor and the output voltage waveform of a specific phase of the encoder is made equal to a predetermined value, rough adjustment of the encoder is executed by aligning the two sets of match marks between each other, a gap between the encoder disc and the sensor is adjusted suitably, and then the sensor base plate is slightly rotated relative to the stator of the brushless motor for executing a fine adjustment of the encoder.

4 Claims, 4 Drawing Sheets

METHOD FOR ADJUSTING ENCODER IN A BRUSHLESS MOTOR-ENCODER COMBINATION

BACKGROUND OF THE INVENTION

This invention relates to a method for precise adjustment of an encoder in a brushless motor-encoder combination.

Heretofore, the precision adjustment of an encoder in a directly coupled brushless motor-encoder combination has been carried out according to a flow chart shown in FIG. 6.

In a step 601 of the flow chart, the brushless motor is deenergized, and an encoder disc assembly formed by mounting an encoder disc (rotatable slit plate) on the shaft of the brushless motor is shifted in the shaft direction, so that a gap formed between the disc assembly and a sensor (having semiconductor elements photo-electrically converting light passing through a fixed slit plate and the rotatable slit plate) is thereby adjusted. When the gap is varied by the rotation of the disc, the sensor output waveform deviates. When the adjustment of the gap terminates, the operation is shifted to a step 602. In this step, the motor is energized, and the positions of the light receiving elements of the sensor are adjusted (A-phase elements and $\overline{A}$-phase elements are combined into one set, while B-phase elements and $\overline{B}$-phase elements are combined into another set. The A phase and B phase are separated by 90°, while the A and $\overline{A}$ phases and B and $\overline{B}$ phases are both separated by 180°, between each other).

The operation is then shifted in a step 603, and the deviation of the surface of the encoder disc in the disc assembly is adjusted while the brushless motor is alternately rotated and stopped several times.

In a step 604, a phase difference $\Phi$ between an EMF voltage waveform induced across one phase of the motor excitation coils and the output of a specific phase such as the A phase of the encoder is observed. When the phase difference $\Phi$ is equal to a predetermined value, the operation proceeds to a step 607 wherein the encoder output voltage is adjusted while the motor is rotated. When the output voltage is found to be satisfactory, the operation terminates in a step 608.

However, when it is found in the step 604 that the phase difference $\Phi$ is deviated from the predetermined value, the motor is stopped and the encoder disc assembly is released from the motor shaft, and displaced therearound so as to correct the phase difference. Such a correction is performed entirely depending on the experience of the operator. The operation is then shifted to a step 606 where the gap is adjusted as in the step 601 while the motor is not rotated. The operation is then returned to the step 603, and the aforementioned routine is repeated until the phase difference $\Phi$ is made equal to the predetermined value. Upon attaining the predetermined value, the operation proceeds to the step 607.

As described above, in a conventional adjustment of the encoder wherein the phase difference $\Phi$ between the EMF voltage waveform and the output voltage waveform of a specific phase of the encoder is made equal to a predetermined value, the surface deflection of the disc assembly and the gap between the disc assembly and the sensor are first adjusted before execution of the encoder adjustment, and then the disc assembly thus adjusted is temporarily fixed to the adjusted position, the motor is thereafter rotated, the EMF voltage waveform and the output voltage waveform of a specific phase of the encoder are observed by use of a measuring instrument, the phase relation is thereby confirmed, the motor is stopped, the disc assembly is released, and the angular position of the disc assembly is corrected such that the phase relation is brought into a predetermined condition.

In this case, the surface deflection (parallelism) and the sensor gap are readjusted.

And then the motor is restarted, the phase relation is confirmed again by use of the measuring instrument, and when the predetermined phase relation has not yet been attained, the aforementioned series of operations are repeated.

The above described procedure requires highly skilled labor and an extremely long operation time. Thus mass-production of such a brushless motor-encoder combination is extremely difficult.

SUMMARY OF THE INVENTION

A basic object of the present invention is to provide an adjusting method of an encoder directly coupled to a brushless motor, wherein the above described difficulties of the conventional method can be substantially eliminated.

Another object of the invention is to provide an adjusting method for an encoder directly coupled to a brushless motor, wherein a phase difference between an EMF voltage waveform generated from the motor and the output voltage waveform generated from a specific phase of the encoder can be brought into a predetermined value easily and in a short time.

These and other objects of the present invention can be achieved by a method for adjusting an encoder directly coupled to a brushless motor, wherein a set of sensor match marks are provided on a sensor base plate mounting a number of sensor elements, while another set of disc match marks are provided on an encoder disc. The disc match marks are provided at postion where a phase difference between an EMF voltage waveform of the motor and the output voltage waveform of a specific phase of the encoder, at a time when the motor is energized but is held in a locked state, is made equal to a predetermined value for executing a rough adjustment of the encoder. A gap between the encoder disc and the sensor elements is adjusted to a suitable value, and then the sensor base plate is slightly rotated relative to the stator of the brushless motor for executing a fine adjustment of the encoder.

DETAILED DESCRIPTION OF THE PERFERRED EMBODIMENTS

Preferred embodiments of the present invention will now be described with reference to FIGS. 1 through 5.

Figure 1:
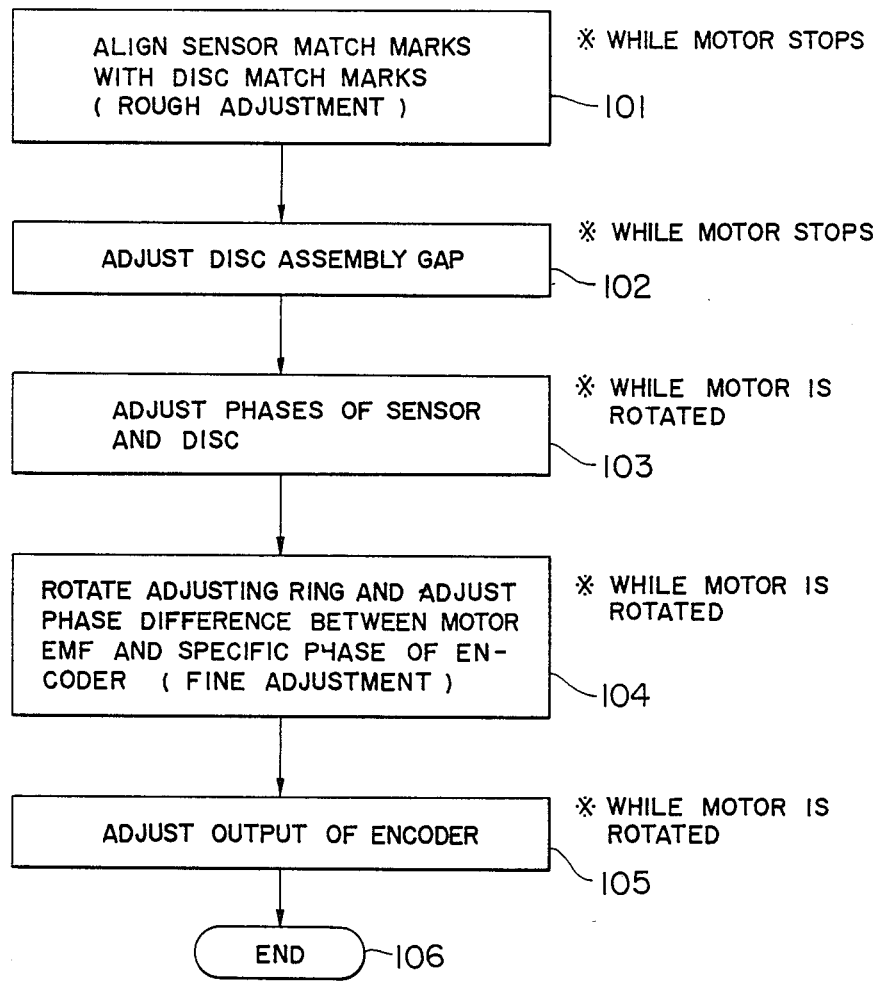
FIG. 1 is a flow chart for explaining the phase adjusting method of the invention applied to an example of a brushless motor-encoder combination.

FIG. 1 is a flow chart showing an adjusting method according to the present invention.

In a step 101 of the flow chart, one phase of the brushless motor is energized while the motor is held in the locked state. In this state, a rotating angle of an encoder disc rendering the phase difference Φ between an EMF voltage waveform of the motor and an output voltage waveform of a specific phase of the encoder to be equal to a predetermined value is estimated. A set of sensor match marks are marked on the internal periphery of the sensor base plate at positions aligned with the specific phase elements, while a set of disc match marks are marked along a circumference of the disc adjacent to the internal periphery of the sensor base plate, at positions corresponding to the estimated rotating angle, and by aligning the two sets of match marks by rotating the encoder disc (while the motor is locked), a rough adjustment of the encoder is accomplished.

In a step 102, the motor is deenergized, and the step 601 of the conventional method is carried out for adjusting the gap between the encoder disc and the sensor base plate, and in step 103, the phase adjustment between the disc and the sensor is performed as in the conventional step 603.

Figure 2:
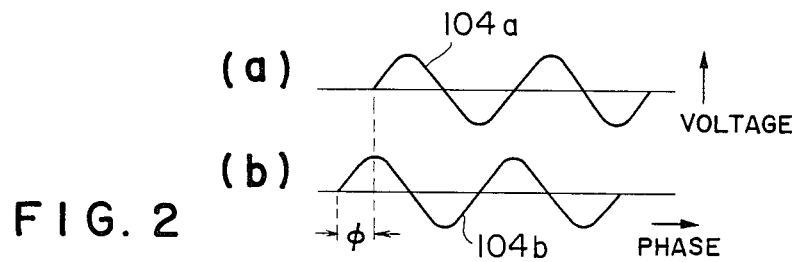
FIG. 2 is a waveform diagram used for explaining the method.
Figure 3:
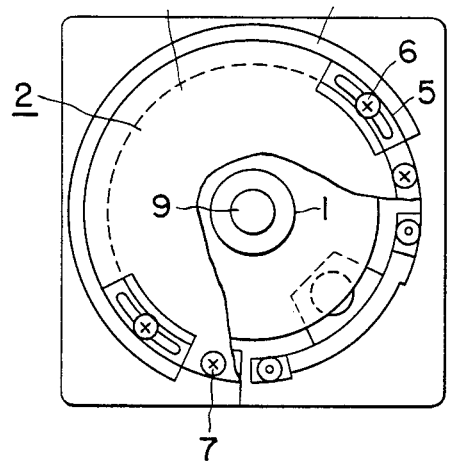
FIGS. 3(a) and 3(b) are a front view and a partly broken-away side view showing an example of the brushless motor-encoder combination.
Figure 3:
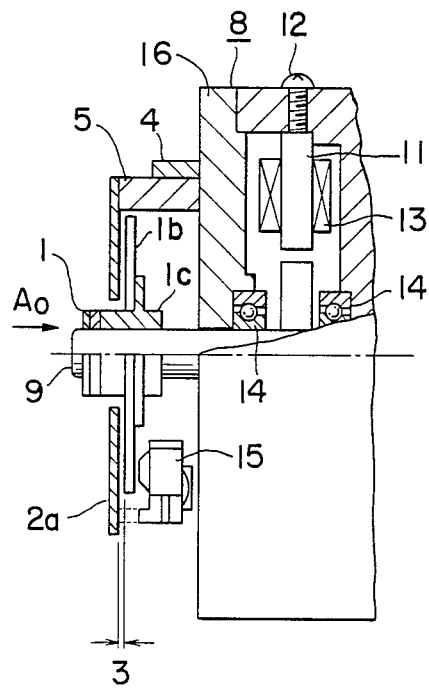

In a step 104, the motor is energized, and an adjusting ring, fixed to the sensor base plate as described hereinlater in more detail, is rotated for executing a fine adjustment such that the phase difference Φ between the EMF voltage waveform 104a of the motor and the voltage waveform 104b of a specific phase of the encoder is made to equal a predetermined value as shown in FIG. 2.

Then the operation proceeds to a step 105 wherein the motor is energized, and the voltage output of the encoder is adjusted as desired. After the adjustment, operation terminates in a step 106.

FIGS. 3(a) and 3(b) illustrate an example of a brushless motor-encoder combination wherein reference numeral 1 designates a disc assembly including an encoder disc 1b and a hub 1c which is releasably secured to the driving shaft 9 of the brushless motor 8. Reference numeral 2 designates a sensor base plate assembly comprising a sensor base plate 2b and sensor elements 2a mounted on the sensor base plate 2b. The sensor elements 2a are made displaceable on the sensor base plate 2b for correcting the positions of A, A̅ and B, B̅ phases of the encoder. Numeral 3 designates a gap formed between the encoder disc 1b and the sensor elements 2a, numeral 4 designates a socket-like member secured to a bracket 16 of the brushless motor 8, and numeral 5 designates an adjustable ring which is adjustably fixed to the sensor base plate 2b and rotatably received in the socket-like member 4 so that the positions of the sensor elements 2a mounted on the sensor base plate 2b are adjusted when the adjustable ring 5 is rotated within the socket-like member 4 relative to the stator of the brushless motor. Numeral 6 designates a pair of screws to be used for adjustably fixing the adjustable ring 5 to the bracket 16 of the brushless motor 8, and numeral 7 designates a pair of screws to be used for adjustably fixing the sensor base plate 2b to adjustable ring 5 after the termination of the sensor position correcting operation. Numeral 11 designates a stator core of the brushless motor 8, numeral 12 designates a screw to be used for temporarily releasing the stator core 11 when the stator core 11 is rotated around the rotor of the brushless motor for the purpose of adjusting the position. Reference numeral 13 designates magnetizing coils for producing a rotating magnetic field, numeral 14 designates bearings for supporting the motor shaft 9 rotatably, and numeral 15 designates a light source for projecting light onto the sensor element 2a through the encoder disc 1b.

Figure 4:
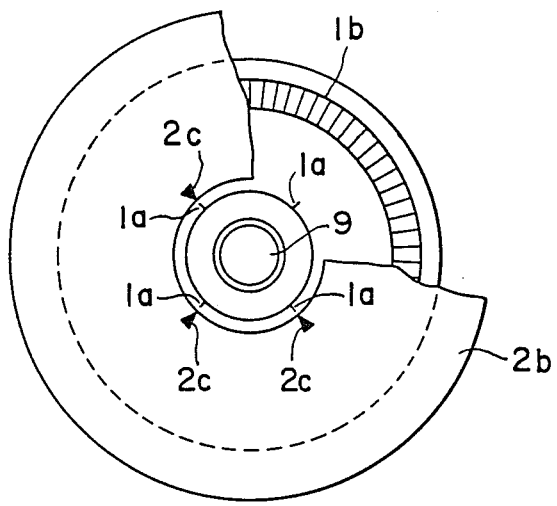
FIG. 4 is a partial front view taken along an arrow $A_o$ in FIG. 3(b)

FIG. 4 is a partly broken-away front view taken in the direction of arrow $A_o$ in FIG. 3(b). The sensor match marks 2c and the disc match marks 1a described in the step 101 in the flow chart shown in FIG. 1 are clearly indicated therein.

The adjustment of the encoder in the above described construction of the brushless motor-encoder combination is carried out as follows.

(1) The motor 8 is energized but is held in the locked state, and the sensor base plate assembly 2 and the encoder disc assembly 1 are attached to the brushless motor 8.

(2) Then the sensor match marks 2c and the disc match marks 1a are brought into alignment (matched state), and thereafter the gap 3 between the encoder disc 1b and the sensor elements 2a is adjusted.

Each of the sensor match marks 2c is located on a diameter passing through the center of a sensor element belonging to a specific phase of the encoder. Each of the disc match marks is located at a position where the phase difference Φ between the theoretically estimated EMF voltage waveform of the motor, and the output voltage waveform of a specific phase of the encoder is made equal to a predetermined value. This value is determined when the motor is energized but is held in a locked state. By aligning the sensor and disc match marks 2c and 1a, a rough adjustment of the encoder can be accomplished.

(3) Then, while the motor is rotated, phase adjustment of the sensor elements 2a relative to the encoder disc 1b is carried out. After the adjustment, the sensor base plate 2b is fixed to the adjusting ring 5 by means of the fixing screws 7.

(4) Then the screws 6 are released, and the adjusting ring 5 is rotated slightly for carrying out a fine adjustment of the phase difference Φ.

(5) Lastly, the output voltage of the encoder is adjusted to a desired value.

According to the present invention, the phase difference Φ between the EMF voltage waveform of the brushless motor and the output voltage waveform of a specific phase of the encoder, theoretically determined in a state where the motor is energized but locked, is made equal to a predetermined value. In order to realize such a positional relation in a rough adjustment manner, sets of match marks marked on the sensor base plate 2b and the encoder disc 1b are brought into alignment, and then a fine adjustment is executed by rotating the adjusting ring 5 relative to the socket-like member 4.

As a result, the adjustment of the encoder is substantially facilitated and the time required for the adjustment is economized.

Although in the above described embodiment of the present invention, the adjustment of the encoder is carried out by rotating the sensor elements 2a relative to the stator 11 of the brushless motor, it may otherwise be accomplished by rotating the stator 11 relative to the sensor elements 2a, thereby displacing the position of the EMF voltage waveform.

In a second embodiment of the present invention, such a feature is utilized, and in the step 104 of the flow chart in FIG. 1, instead of rotating the adjusting ring 5 supporting the sensor base plate 2b, the securing screws 12 of the stator core 11 are released, and the stator core 11 is rotated around the rotor for adjusting the EMF voltage waveform relative to the output waveform of a specific phase of the encoder.

Figure 5A:
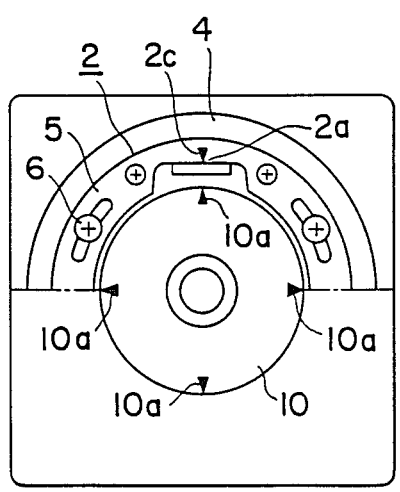
FIGS. 5(a) and 5(b) are a front view and a partly broken-away side view showing another example of the combination.
Figure 5B:
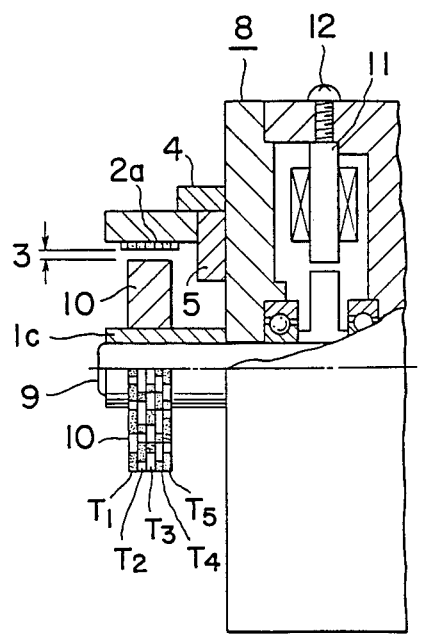
Figure 6:
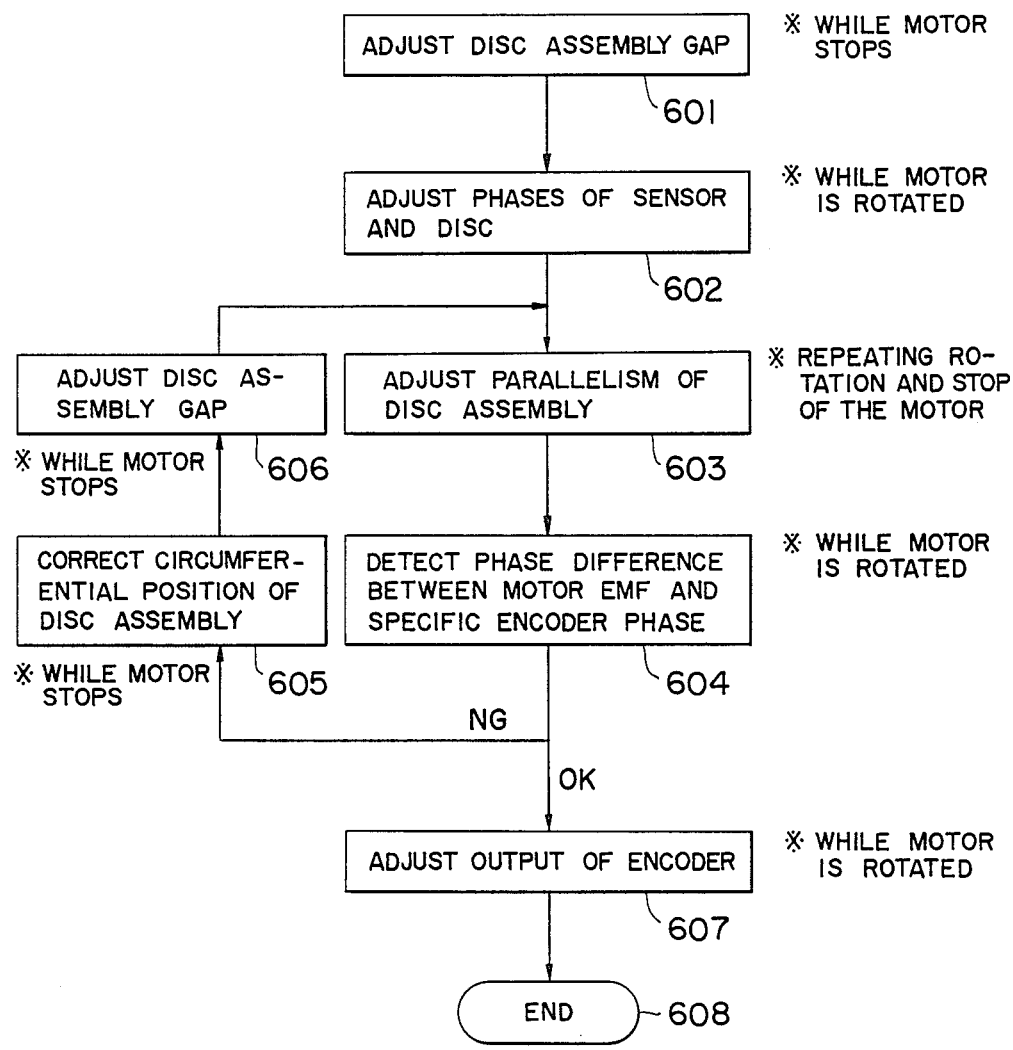
FIG. 6 is a flow chart showing a conventional method for adjusting an encoder in a brushless motor-encoder combination.

FIGS. 5(a) and 5(b) illustrate a different example of the brushless motor-encoder combination to which the present invention is applied. In the example, similar members as those in FIGS. 3(a) and 3(b) are designated by similar reference numerals. In the example shown in FIGS. 5(a) and 5(b), a magnetic encoder is used instead of the photosensitive encoder of FIGS. 3(a) and 3(b). In the example, numeral 10 designates a magnetic drum, and numeral 10a designates match marks provided on the magnetic drum 10. On the outer peripheral surface of the magnetic drum 10, a number of magnetic pattern tracks $T_1-T_5$ are formed, each pattern being varied along the circumference of the magnetic drum 10. Numeral 2a designates a magnetic sensor provided outwardly of the magnetic drum 10 with a gap 3 maintained therebetween. The sensor 2a is adjustably secured to an adjustable ring 5, and reads out the variation of patterns when the drum 10 is rotated. A set of sensor match marks 2c are also provided on the sensor 2a.

According to the present invention, since a plurality of match marks are provided on the sensor means and the disc or drum means for executing a rough adjustment of the encoder, and means for slightly rotating the sensor or the stator core are provided for executing a fine adjustment of the encoder, the phase adjustment of the output voltage waveform of the encoder can be easily adjusted in a short time, and the reliability of the encoder can be substantially improved while the construction cost thereof can be economized.

What is claimed is:

1. A method for adjusting an encoder in a brushless motor-encoder combination comprising a brushless motor including a rotor comprising a magnetic core having a cylindrical shape, a permanent magnet which is alternately magnetized to different polarities at an equal pitch and which is secured onto the outer periphery of the magnetic core, and a shaft which is integrally formed with the magnetic core and rotatably supported by bearings that, in turn, are supported by a bracket forming one part of an outer casing of the brushless motor, and a stator comprising a stator core made of laminated steel plates and having an internal cylindrical surface facing the outer periphery of the rotor magnetic core, teeth formed on the internal surface of the stator core in a manner opposing the permanent magnet of the rotor, and excitation coils provided in the teeth for generating a rotating magnetic field therein; and an encoder including an encoder disc assembly formed by an encoder disc and a hub through which the encoder disc is secured to the motor shaft, and a sensor base plate assembly formed by a sensor base plate in opposition to the encoder disc and a plurality of sensor elements mounted thereon, the sensor base plate assembly being indirectly coupled with the bracket of said motor, said method comprising the steps of:

(A) providing a set of sensor match marks on said sensor base plate at positions aligned with diametrical lines passing through the centers of the sensor elements of a specific phase, and a set of disc match marks on the encoder disc at positions where a predetemined phase difference Φ is obtained between a theoretically determined EMF voltage waveform of said motor at a time when the motor is held in an energized but locked state, and the output voltage waveform of said specific phase of said encoder;

(B) bringing said sets of match marks into alignment for executing a rough adjustment of the encoder;

(C) while the motor is held in a stopped state, displacing the encoder disc assembly in the axial direction for adjusting a gap formed between the disc assembly and the sensor elements;

(D) while the motor is rotated, adjusting the positions of the sensor elements on the sensor base plate such that the output signals delivered from said sensor elements as a result of the motor rotation exhibit predetermined phase angles therebetween;

(E) while the motor is held in a rotating state, rotating an adjustable ring which is adjustably connected with the sensor base plate and is rotatably received in a socket member secured to the bracket of the motor around the motor shaft to effect a fine adjustment of the encoder; and (F) while the motor is held in the rotating state, adjusting the magnitude of the output voltage of the encoder to a predetermined value.

2. A method for adjusting an encoder in a brushless motor-encoder combination comprising a brushless motor including a rotor comprising a magnetic core having a cylindrical shape, a permanent magnet which is alternately magnetized to different polarities at an equal pitch and which is secured onto the outer periphery of the magnetic core, and a shaft which is integrally formed with the magnetic core and rotatably supported by bearings that, in turn, are supported by a bracket forming one part of an outer casing of the brushless motor, and a stator comprising a stator core made of laminated steel plates and having an internal cylindrical surface facing the outer periphery of the rotor magnetic core, teeth formed on the internal surface of the stator core in a manner opposing the permanent magnet of the rotor, and excitation coils provided in the teeth for generating a rotating magnetic field therein, and an encoder including an encoder disc assembly formed by an encoder disc and a hub through which the encoder disc is secured to the motor shaft, and a sensor base plate assembly formed by a sensor base plate in opposition to the encoder disc and a plurality sensor elements mounted thereon, the sensor base plate assembly being indirectly coupled with the bracket of said motor, said method comprising the steps of:

(A) providing a set of sensor match marks on said sensor base plate at positions aligned with diametrical lines passing through the centers of the sensor elements of a specific phase, and a set of disc match marks on the encoder disc at positions where a predetermined phase difference Φ is obtained between a theoretically determined EMF voltage waveform of said motor at a time when motor is held in an energized but locked state, and the output voltage waveform of said specific phase of said encoder;

(B) bringing said sets of match marks into alignment for executing a rough adjustment of the encoder;

(C) while the motor is held in a stopped state, displacing the encoder disc assembly in the axial direction for adjusting a gap formed between the disc assembly and the sensor elements;

(D) while the motor is rotated, adjusting the positions of the sensor elements on the sensor base plate such that the output signals delivered from said sensor elements as a result of the motor rotation exhibit predetermined phase angles therebetween;

(E) while the motor is held in a rotating state, adjusting the position of the stator core in the rotational direction of the motor shaft to effect a fine adjustment of the encoder; and (F) while the motor is held in the rotating state, adjusting the magnitude of the output voltage of the encoder to a predetermined value.

3. A method for adjusting an encoder in a brushless motor-encoder combination comprising a brushless motor including a rotor comprising a magnetic core having a cylindrical shape, a permanent magnet which is alternately magnetized to different polarities at an equal pitch and which is secured onto the outer periphery of the magnetic core, and a shaft which is integrally formed with the magnetic core and rotatably supported by bearings that, in turn, supported by a bracket forming one part of an outer casing of the brushless motor, and a stator comprising a stator core made of laminated steel plates and having an internal cylindrical surface facing the outer periphery of the rotor magnetic core, teeth formed on the internal surface of the stator core in a manner opposing the permanent magnet of the rotor, and excitation coils provided in the teeth for generating a rotating magnetic field therein; and an encoder including a magnetic drum, a hub by which the drum is secured to the motor shaft, and a sensor means comprising a magnetic sensor provided outwardly of the magnetic drum, the sensor means being indirectly coupled with the bracket of said motor, said method comprising the step of:

(A) providing a first set of match marks on said sensor with at least one of said first provided match marks being located at a position aligned with a line which passes through the center of the sensor and corresponds to a specific phase of the encoder, and a second set of match marks on the magnetic drum at positions where a predetermined phase difference Φ is obtained between a theoretically determined EMF voltage waveform of said motor at a time when the motor is held in an energized but locked state, and the output voltage waveform of said specific phase of the encoder;

(B) bringing said first and second sets of match marks into alignment for executing a rough adjustment of the encoder;

(C) while the motor is held in a stopped state, adjusting the width of a gap formed between the magnetic drum and the magnetic sensor;

(D) while the motor is rotated, adjusting the position of the magnetic sensor such that output signals delivered from the sensor as a result of the motor rotation exhibit predetermined phase angles therebetween;

(E) while the motor is held in a rotating state, rotating an adjustable ring which is adjustably connected with the magnetic sensor and is rotatably received in a socket member secured to the bracket of the motor, around the motor shaft to effect a fine adjustment of the encoder; and (F) while the motor is held in the rotating state, adjusting the magnitude of the output voltage of the encoder to a predetermined value.

4. A method for adjusting an encoder in a brushless motor-encoder combination comprising a brushless motor including a rotor comprising a magnetic core having a cylindrical shape, a permanent magnet which is alternately magnetized to different polarities at an equal pitch and which is secured onto the outer periphery of the magnetic core, and a shaft which is integrally formed with the magnetic core and rotatably supported by bearings that, in turn, are supported by a bracket forming one part of an outer casing of the brushless motor, and a stator comprising a stator core made of laminated steel plates and having an internal cylindrical surface facing the outer periphery of the rotor magnetic core, teeth formed on the internal surface of the stator core in a manner opposing the permanent magnet of the rotor, and excitation coils provided in the teeth for generating a rotating magnetic field therein; and an encoder including a magnetic drum, a hub by which the drum is secured to the motor shaft, and a sensor means comprising a magnetic sensor provided outwardly of the magnetic drum, the sensor means being indirectly couple with the bracket of said motor, said method comprising the steps of:

(A) providing a first set of macth marks on said sensor with at least one of said first provided match marks being located at a position in alignment with a line which passes through the center of the sensor and corresponds to a specific phase of the encoder, and a second set of match marks on the magnetic drum at positions where a predetemined phase difference Φ is obtained between a theoretically determined EMF voltage waveform of said motor at a time when the motor is held in an energized but locked state, and the output voltage waveform of said specific phase of the encoder;

(B) bringing said first and second sets of match marks into alignment for executing a rough adjustment of the encoder;

(C) while the motor is held in a stopped state, adjusting the width of a gap formed between the magnetic drum and the magnetic sensor;

(D) while the motor is rotated, adjusting the positions of the magnetic sensor such that output signals delivered from the sensor as a result of the motor rotation exhibit predetermined phase angles therebetween;

(E) while the motor is held in a rotating state, adjusting the position of the stator core in the rotational direction of the motor shaft to effect a fine adjustment of the enconder; and (F) while the motor is held in the rotating state, adjusting the magnitude of the output voltage of the encoder to a predetermined value.

* * * * *